Figures 1, 2, 3, 4:
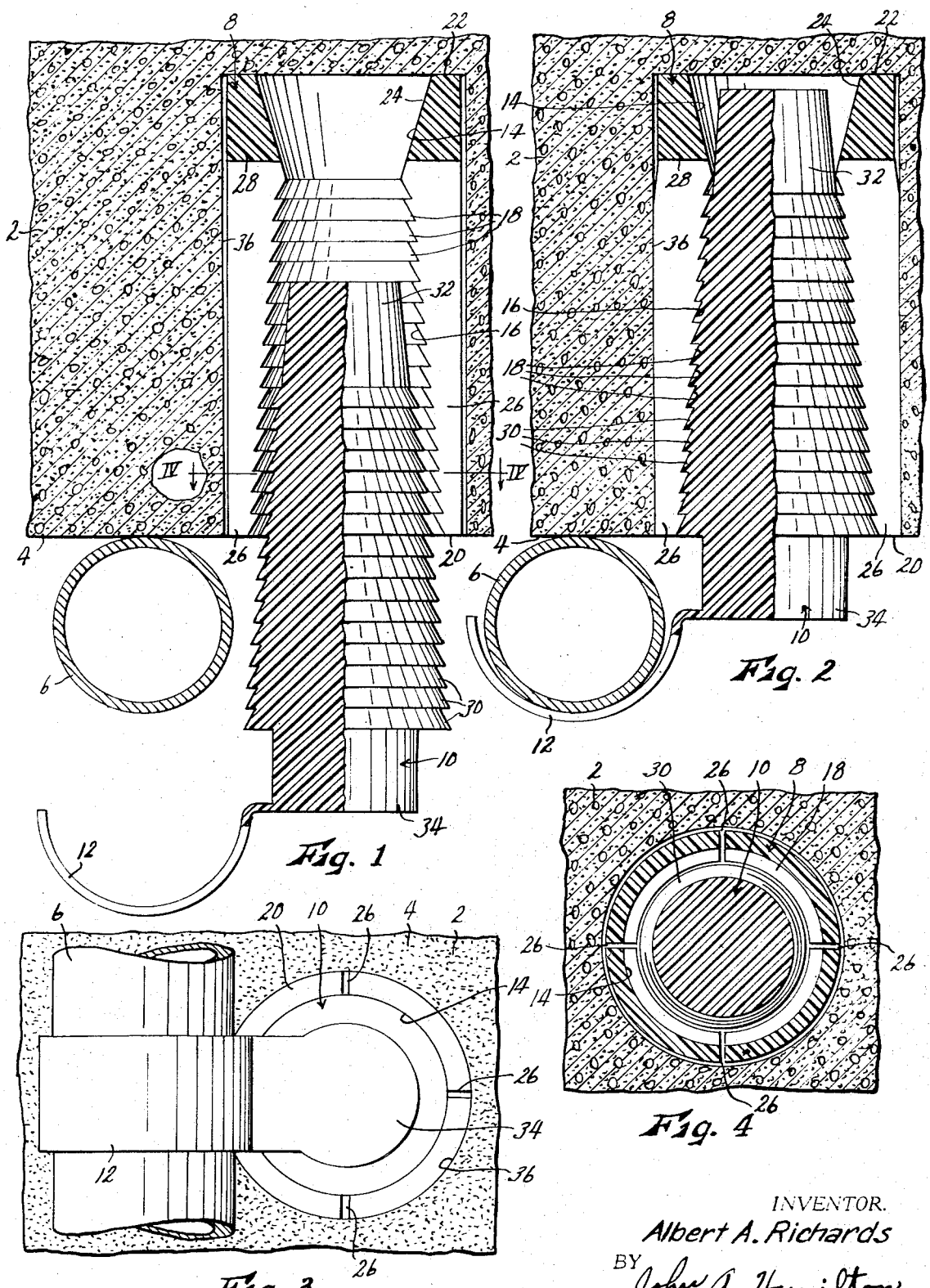

United States Patent [19]
Richards

[11] 3,779,495
[45] Dec. 18, 1973

[54] WALL ANCHOR FOR ELECTRICAL CONDUITS

[76] Inventor: Albert A. Richards, 7127 Lafayette St., Wyandotte, Kans. 66109

[22] Filed: Aug. 5, 1971

[21] Appl. No.: 169,278

[52] U.S. Cl................. 248/71, 85/84, 248/220.5
[51] Int. Cl............................................ F16b 15/04
[58] Field of Search................. 248/71, 223, 220.5; 85/84, 79, 82, 83

[56] References Cited
UNITED STATES PATENTS

| 3,022,701 | 2/1962 | Potruch | 85/83 |
| 3,613,497 | 10/1971 | Heldermann | 85/84 |
| 2,570,957 | 10/1951 | Lee | 248/74 R |
| 2,326,855 | 8/1943 | Hathorn | 85/84 |
| 3,298,725 | 1/1967 | Boteler | 85/84 X |

FOREIGN PATENTS OR APPLICATIONS

| 124,974 | 4/1928 | Switzerland | 85/82 |
| 295,595 | 3/1954 | Switzerland | 85/83 |
| 447,768 | 0/1969 | Japan | 85/72 |
| 231,935 | 1/1961 | Australia | 85/84 |
| 1,167,187 | 11/1958 | France | 248/223 |

*Primary Examiner*—Ramon S. Britts
*Assistant Examiner*—Rodney H. Bonck
*Attorney*—John A. Hamilton

[57] ABSTRACT

A wall anchor for securing electrical conduits or the like to concrete walls, and consisting of a tubular, internally tapered, elastically expansible plug adapted to be inserted freely into a cylindrical socket drilled therefor in the wall, and a correspondingly tapered core member adapted to be driven into the plug whereby to expand the latter into tight frictional engagement with the wall of the socket, and a hook member carried by the core at the outer end of said core and operable, as the core is driven, to clamp an electrical conduit against the wall surface.

1 Claim, 4 Drawing Figures

INVENTOR.
Albert A. Richards
BY John A. Hamilton
Attorney.

WALL ANCHOR FOR ELECTRICAL CONDUITS

This invention relates to new and useful improvements in wall anchors, and has particular reference to a wall anchor for use in stringing electrical conduits, cables, and the like in dwellings or other buildings, being operable to secure said conduits, cables, or the like securely to a wall of concrete or other material.

A principal object of the present invention is the provision of a wall anchor of the character described including an anchor assembly adapted to be inserted loosely into a socket drilled therefor in a wall, and including a hook member adapted to secure an electrical conduit against said wall, and means whereby said anchor assembly may be secured tightly in said socket, and said hook operated to clamp said conduit against said wall, by means of a single operation such as a hammer blow.

Other objects are extreme simplicity and economy of construction, and efficiency and dependability of operation.

With these objects in view as well as other objects which will appear in the course of the specification, reference will be had to the accompanying drawing, wherein:

FIG. 1 is a longitudinal sectional view, with parts left in elevation and partially broken away, of a wall anchor embodying the present invention, with the parts shown in a position preparatory to the final securing of the anchor, FIG. 2 is a view similar to FIG. 1, but showing the anchor fully secured, FIG. 3 is a fragmentary face view of the wall and anchor as shown in FIG. 2, and FIG. 4 is a sectional view taken on line IV—IV of FIG. 1.

Like reference numerals apply to similar parts throughout the several views, and the numeral 2 applies to a concrete wall, with the numeral 4 designating the surface of said wall to which it is desired to mount an electrical conduit 6 or the like. It will be apparent, however, that the anchor contemplated by the present invention is applicable also to walls other than concrete, such as stone, plaster, or the like.

The wall anchor as shown and described includes a plug member 8, a core member 10, and a hook member 12, all formed of plastic, metal or other suitable material (plastic illustrated). Plug member 8 is externally cylindrical, and is tubular, having a circular bore 14 extending the full length thereof. Throughout the major portion of the length of said bore, it is taperingly enlarged toward one end thereof, as indicated at 16, and the resulting hollow conical surface has a continuous series of peripheral ribs 18 formed thereon, the surfaces defining each of said ribs being respectively planar and disposed at right angles to the plug axis, and of frustro-conical form with their larger diameter ends toward the outer end 20 of the plug. The remaining portion of bore 14 is taperingly enlarged toward the opposite or inner end 22 of the plug, as indicated at 24. Also, the walls of the plug are slotted longitudinally at angularly spaced intervals thereabout as indicated at 26, said slots opening through the outer end of the plug but terminating short of its inner end 22, extending the full length of the ribbed portion 16 of bore 14, and leaving an uninterrupted ring portion 28 of the plug aligned with portion 24 of the bore. The exterior surface of the plug is smoothly cylindrical as shown, but could be roughened if necessary or desired, as will appear.

Core member 10 is solid, is tapered correspondingly to the taper of bore 16, and is provided with peripheral ribs 30 along a major portion of its length, said ribs corresponding in contour to ribs 18 of plug 8. The length of its tapered portion is slightly less than the length of plug 8. The smaller end portion of the core is not ribbed for a distance from its extreme end, whereby to form a smooth, frustro-conical nosepiece 32. The diameter of the outer or larger end of the conical portion of the core is somewhat greater than the normal diameter of the outer or larger end of the bore 14 of the plug. The plug is provided at its outer end with a cylindrical extension 34 of reduced diameter, and hook 12 extends laterally from the outer end of said extension. Said hook, which may be integral with or firmly affixed to the plug, is of generally semi-cylindrical curvature, opening toward the smaller end of the core, in transversely offset relation from the core axis.

In operation, a socket 36 of slightly larger diameter than the normal diameter of plug 8 is first drilled in wall 2 from surface 4 thereof, said socket having a depth generally equal to the axial length of plug 8. Plug 8 is then inserted loosely into the socket, so that its outer end is generally flush with wall surface 4, and with the larger end of bore 14 thereof disposed at its exposed outer end. The smaller end of core 10 (nosepiece 32 thereof) is then inserted into bore 14 of the plug, and electrical conduit 6, or any other element to be anchored to the wall, is disposed between hook 12 and wall surface 4. The parts then have the relative positions shown in FIG. 1. Then a strong inward pressure is exerted on the outer end of the core, as by a sharp hammer blow delivered to the outer end of core extension 34, to drive the core inwardly in plug bore 14 to the position shown in FIG. 2, or as far as may be permitted. This clamps conduit 6 firmly in position between hook 12 and wall surface 4, the resilience of the hook permitting it to yield and be deformed, whereby to hold the conduit firmly despite any normal variation in the depth to which the core may be driven into the plug.

The driving of the core into the plug of course expands the plug resiliently to force its exterior surface into firm engagement with the wall of socket 36, as shown in FIG. 2, whereby to prevent accidental withdrawal of the plug from said socket. As long as the plug is made of a relatively soft, indentable material such as plastic, it will be seen that the inherent roughness of the wall of a socket 36 drilled in concrete, stone or any other material in connection with which the anchor is likely to be used will cause indentation of the plug fully adequate to secure the plug in the socket. Of course, if a hard metal plug is utilized, which could not be readily indented, then it might be necessary to roughen the exterior surface of the plug, for example by providing ribs thereon similar to internal ribs 18. This is considered to be within the scope of the invention. The expansion of the plug is of course permitted by slots 26 formed in the wall thereof, the reverse slope of inner portion 24 of the plug bore providing that ring portion 28 of the plug will not be subjected to expansive forces. This ring portion is of course not expandable to any great degree, and exertion thereon of expansive forces by the core would so resist the inward movement of the core as to inhibit the expansion of the slotted portion of the plug.

In some applications, it would be practical to use a plug formed entirely of a softer, more elastic material such as a softer plastic or even a firm rubber, so that slots 26 could be dispensed with. However, this would so reduce the structural strength of the anchor as to substantially reduce its holding power, and the use of a firmer plug material, slotted as shown, is therefore considered preferable.

The interengaging action of plug ribs 18 and core ribs 30 anchors the core against accidental removal from the plug. Their contour as shown provides a positive locking action against removal, while at the same time they may be sufficiently yieldable to deform and pass each other as the core is driven into the plug. However, the specific contour of the ribs, or even the use of ribs at all, is exemplary only and not intended as a limitation on the scope of the invention. Various other configurations could be used to provide roughness fully adequate for the stated purpose. In fact, if the taper of plug bore 14, and of core 10, could be made sufficiently gradual to be self-locking, then no roughening of the cooperating surfaces, would be required at all. However, this would require either that the plug and core be inconveniently long to provide the necessary degree of plug expansion, or that the plug fit very closely in socket 36 and that the socket be formed very accurately, to provide the necessary plug expansion in a short movement of the core. For these reasons, a steeper taper, with some type of surface roughening, is preferred.

While I have shown and described a specific embodiment of my invention, it will be readily apparent that many minor changes of structure and operation could be made without departing from the spirit of the invention.

What I claim as new and desire to protect by Letters Patent is:

1. A wall anchor comprising:
   a. an externally cylindrical, resiliently expansible plug adapted to be inserted loosely into a cylindrical socket formed therefor in a wall from an exposed surface of said wall, said plug being tubular and having a bore taperingly enlarged along a major portion of its length toward the end thereof exposed at the open end of said socket, and taperingly enlarged toward the opposite end of said plug member along the remainder of its length, and having longitudinal slots formed therein at angular intervals thereabout, said slots extending the full length of the first of said tapered bore sections, and into but not through the second of said tapered bore sections,
   b. a core member tapered correspondingly to the first of said tapered bore sections, and adapted to be inserted smaller end first into said first tapered bore section, and to be driven therein to expand said plug into tight engagement with the wall of said socket, and
   c. a hook member carried by said core member at the larger end thereof and extending laterally therefrom, whereby an object may be secured between said hook member and said wall surface as said core member is driven into said plug member.

* * * * *